United States Patent [19]

Yoshizaki et al.

[11] 3,981,843

[45] Sept. 21, 1976

[54] IMPACT-RESISTANT, FLAME-RETARDANT RESIN COMPOSITION

[75] Inventors: Hiroyuki Yoshizaki, Toyonaka; Hiromitsu Takanohashi, Takarazuka; Yoshitaka Masuda, Toyonaka; Yukio Hozumi, Sakai; Akira Ohi, Sakai; Yuzo Sonoyama, Sakai, all of Japan

[73] Assignees: Daicel, Ltd., Osaka; Mitsubishi Gas Chemical Company, Inc., Tokyo, both of Japan

[22] Filed: Sept. 27, 1974

[21] Appl. No.: 510,047

[30] Foreign Application Priority Data

Sept. 28, 1973 Japan............................ 48-109575

[52] U.S. Cl. ..................... 260/45.75 B; 260/869; 260/873; 264/211
[51] Int. Cl.² ..................... C08K 5/59; C08L 67/06
[58] Field of Search .............. 260/873, 869, 45.75 B

[56] References Cited
UNITED STATES PATENTS

| | | | |
|---|---|---|---|
| 3,334,154 | 8/1967 | Kim | 260/860 |
| 3,649,712 | 3/1972 | Grabowski | 260/873 |
| 3,663,471 | 5/1972 | Schirmer et al. | 260/873 |

*Primary Examiner*—J. Ziegler
*Attorney, Agent, or Firm*—Woodhams, Blanchard and Flynn

[57] ABSTRACT

An impact-resistant, flame-retardant resin composition is disclosed comprising
I. 100 parts by weight of a resin mixture of:
A. 15 to 85 weight percent of ABS resin, and
B. 15 to 85 weight percent of a high molecular weight aromatic polycarbonate copolymer derived from 5 to 50 weight percent of a bisphenol the nucleus of which is substituted with a halogen, and 50 to 95 weight percent of an unsubstituted bisphenol, and
II. 0.001 to 5 parts by weight of an inorganic or organic antimony compound.

8 Claims, No Drawings

IMPACT-RESISTANT, FLAME-RETARDANT RESIN COMPOSITION

BACKGROUND OF THE INVENTION

1. Field of the Invention

This invention relates to an impact-resistant, flame-retardant resin composition. More particularly, this invention relates to an impact-resistant, flame-retardant resin composition obtained by adding a small amount of an antimony compound to a resin mixture of ABS resin and a high molecular weight aromatic polycarbonate copolymer containing as one monomer unit a bisphenol the nucleus of which is substituted with a halogen.

2. Description of the Prior Art

In modern technology synthetic resins have been used for a wide variety of purposes. However, most synthetic resins are generally flammable, and there is danger connected with their use for this reason. Flame-retarding treatment of synthetic resins has been demanded for various uses.

For converting a combustible vinyl polymer into a flame-retardant one, processes are known wherein a flame-retarding agent or a flame-retarding resin is blended into the vinyl polymer, and wherein a polymerizable flame-retarding compound is copolymerized with a vinyl monomer to obtain a polymer which per se is flame-retardant.

Various processes have been proposed, for example, in British Patent No. 1,061,371, Japanese Patent Publications Nos. 3214/1970 and 3174/1971, and Japanese Patent Laid-open Specification Nos. 7133/1972 and 52834/1973. However, to obtain flame-retardant resins by incorporation of a flame-retarding agent according to these processes, the use of a quite large amount of the flame-retarding agent is required. It is difficult not to impair the other desireable properties of the vinyl polymer or to obtain a polymer product having satisfactory physical properties when a large amount of flame-retarding agent is incorporated therein. The higher the required flame resistance, the more difficult it is to obtain a polymer product having satisfactory physical properties. Copolymers and polymer blends possessing sufficient flame resistance and physical properties have not yet been obained by copolymerizing monomers with a flame-retarding compound or by blending polymers with a flame-retarding resin such as vinyl chloride or chlorinated polyethylene.

If a nucleus-halogenated bisphenol or a low molecular weight polycarbonate derived therefrom and antimony trioxide are added to an ABS resin as described in the above-mentioned Japanese Laid-open Specifications No. 7133/1972 or 52834/1973, the physical properties such as impact resistance and heat resistance are impaired seriously, even though the composition can possess a flame-retardant property. Thus, an acceptable commercial product is not obtained.

SUMMARY OF THE INVENTION

We have discovered that, if an ABS resin having an impact strength in the range of from about 10 to 20 kg.cm/cm is mixed with a halogen-containing aromatic polycarbonate having an impact strength in the range of from about 5 to 10 kg.cm/cm, molded articles made of the resulting mixture have an impact strength higher than that of the respective individual constituent resins. If the weight ratios of the two resins are suitably selected, the impact strength of the resin mixture is several times higher than that of the respective resins used alone.

By this process, however, the flame retardancy of the resin mixture is still insufficient, even though improved physical properties are obtained.

We have further discovered that a satisfactory flame-resistant resin composition can be obtained by adding a critical amount of an antimony compound to the above described resin mixture. More particularly, we have found that the flame retardance of the resin mixture can be improved greatly, without impairing the other properties thereof, by incorporating an antimony compound therein, even though this result apparently cannot be obtained by incorporating other known flame-retarding agents therein. This fact is quite unique and contrary to expectations that all physical properties of polycarbonate resins are impaired if an antimony compound is incorporated in the polycarbonate resins. This unexpected discovery forms a basis for the present invention.

The present invention therefore relates to an impact-resistant, flame-retardant resin composition comprising I. the resin constituents of said compositions comprise
  A. 15 to 85 weight percent of ABS resin and
  B. 15 to 85 weight percent of a high molecular weight aromatic polycarbonate copolymer composed of (1) 5 to 50 weight percent of a bisphenol the nucleus of which is substituted with a halogen and (2) 50 to 95 weight percent of an unsubstituted bisphenol, and II. an inorganic or organic antimony flame-retardant compound, in an amount of from 0.3 to 5 parts by weight of II, per 100 parts by weight of I.

The resin composition according to the present invention has a high impact strength and a high flame resistance and/or self-extinguishing property. Even if a molded product prepared from the composition according to this invention is ignited by contacting it with a flame, the thus-treated resin scarcely melts or forms drops. This demonstrates the excellent flame-retardancy of the resin.

The term "flame resistance" herein means that the combustibility of the resin composition is substantially lower in comparison with the untreated resin composition. The term "self-extinguishing property" means that, after a flame source has been removed from the resin composition, the resin composition itself does not continue to burn and it becomes extinguished, i.e. it does not support combustion. The term "flame retardancy" herein includes both flame resistance and self-extinguishing property.

The ABS resin in the resin composition according to the present invention includes a resin obtained by graft-copolymerizing a vinyl cyanide compound such as acrylonitrile and a vinyl aromatic hydrocarbon such as styrene, in the presence of a polymer containing as one ingredient a butadiene compound such as polybutadiene or styrene-butadiene copolymer; a resin composition obtain by mixing said graft-copolymerized resin with a vinyl cyanide compound/vinyl aromatic hydrocarbon copolymer resin; and a resin composition obtained by homogeneously mixing polybutadiene or a copolymer comprising butadiene as one ingredient with said vinyl cyanide compound/vinyl aromatic hydrocarbon copolymer resin.

The ABS resin of the present invention also includes a resin generally called "transparent ABS resin", obtained by replacing a part, i.e. from 30 to 60 weight percent, of the vinyl aromatic hydrocarbon monomer with another monomer such as methyl methacrylate or a composition containing said resin. The vinyl cyanide compounds herein refer to monomers such as acrylonitrile and methacrylonitrile and mixtures of said monomers. The vinyl aromatic hydrocarbons refer to monomers such as styrene, α-methylstyrene, dimethylstyrene and styrenes the nucleus of which is substituted with a halogen, and mixtures of said monomers.

Referring to the proportion of the vinyl cyanide compound to the vinyl aromatic hydrocarbon used in the preparation of said ABS resin, the vinyl cyanide compound is used in an amount of 10 to 50 weight percent, preferably 20 to 40 weight percent and the vinyl aromatic hydrocarbon is used in an amount of 50 to 90 weight percent, preferably 60 to 80 weight percent. The polybutadiene or butadiene copolymer is used in an amount of 5 to 50 parts by weight, preferably 10 to 35 parts by weight, per 100 parts by weight of the monomeric mixture of vinyl cyanide compound and vinyl aromatic hydrocarbon.

The reasons for adopting these weight ratios will be understood from the physical properties of the resulting ABS resin, and the reasons are described in detail in, for example, Chem. Ind. (London) 1966, No. 33, 1399 (Aug. 1966).

The high molecular weight aromatic polycarbonate copolymer used in the resin composition according to the present invention is obtained by copolymerizing (1) a bisphenol the nucleus of which is substituted with a halogen (hereinafter referred to as nucleus-halogen-substituted bisphenol) and (2) an unsubstituted bisphenol. In the aromatic polycarbonate copolymer, the nucleus-halogen-substituted bisphenol is contained in an amount of 5 to 50 weight percent, preferably 5 to 30 weight percent, based on the total bisphenols. If the nucleus-halogen-substituted bisphenol content is less than 5 weight percent, a sufficient flame retardancy is not imparted to the resin composition. On the other hand, if the nucleus-halogen-substituted bisphenol content is more than 50 weight percent, the molding properties of not only the aromatic polycarbonate copolymer but also the resin composition as a whole are impaired seriously. Thus, the nucleus-halogen-substituted bisphenol content within said range of 5 to 50 weight percent is preferred in practice.

The unsubstituted bisphenols employed herein include bisphenols of 2,2,-bis-(4-hydroxyphenyl)-alkanes wherein the linkage alkane has 1 to 10 carbon atoms, and said linkage alkane may be replaced with a linkage such as ether, sulfone, sulfide and sulfoxide. The nucleus-halogen-substituted bisphenols employed herein include 3,5-halogen-substituted analogues of said unsubstituted bisphenols, i.e. tetrahlo compounds, particularly tetrachloro and tetrabromo compounds, especially tetrabromo compounds. As preferred examples of the unsubstituted bisphenols, there can be mentioned 2,2-bis-(4-hydroxyphenyl)propane (hereinafter referred to as BPA) commonly known as bisphenol A. As the nucleus-halogen-substituted bisphenol, 2,2,-bis(3,5-dibromo-4-hydroxyphenyl)-propane (hereinafter referred to as tetrabromobisphenol A or TBBPA) is particularly preferred.

The copolymers obtained from those bisphenols and used in the present invention are prepared by known processes such as the phosgene process, the pyridine process and the chloroformate process. Preferably, the copolymers have a limiting viscosity (in methylene chloride, at 25°C) of at least 0.25, particularly 0.45 to 0.75. Low molecular weight copolymers having a limiting viscosity of less than 0.25 or high molecular weight copolymers having a limiting viscosity of more than 0.75 are unsuitable with respect to the physical properties and molding property of the resin composition.

Antimony compounds used in the present invention include, for example, inorganic compounds such as antimony trioxide ($Sb_2O_3$) and antimony phosphate and organic compounds such as antimony esters of organic acids and cycloalkyl antimonite. The antimony compounds used in the present invention are not critical and the selection of a specific antimony compound is made from the viewpoint of cost. Among these antimony compounds, antimony trioxide is preferred because it is obtainable most readily and exhibits the most excellent effect in the present invention.

The proportion of ABS resin (A) to high molecular weight aromatic polycarbonate copolymer (B) in the resin composition of the present invention is 15 to 85 weight percent of (A) to 15 to 85 weight percent of (B). The antimony compound is used in an amount of from 0.3 to 5 parts by weight, per 100 parts by weight of the resin mixture (A) plus (B). Giving due regard to the flame retardancy and the physical properties of the resin composition, the preferred amounts are: 35 to 70 weight percent of (A), 30 to 65 weight percent of (B) and 0.5 to 3 parts by weight of the antimony compound.

As for the method of blending the ABS resin, the halogen-containing aromatic polycarbonate copolymer and the antimony compound, powders of the three components can be mixed together after drying, if necessary, or the three components can be mixed mechanically and the resin components melted using a conventional extruder, Banbury mixer or roller mill, to obtain a homogeneous mixture of proper proportions which can then be subjected to a molding operation.

Thus, the resin composition of the present invention maintains the desired intrinsic properties of the constituents, i.e. the ABS resin and the halogen-containing aromatic polycarbonate copolymer resin, and, in addition, the composition exhibits more excellent properties such as enhanced and improved mechanical properties, e.g. impact strength; thermal properties, e.g. heat distortion temperature and a high flame-retarding property.

The resin composition according to the present invention has well-balanced properties which are not obtained in conventional resin compositions containing known flame-retarding agents. Thus, according to the present invention, practical and highly useful resin compositions are provided.

Into the resin composition according to the present invention, there can be further incorporated stabilizers, antioxidizing agents, plasticizers, ultraviolet ray-absorbing agents, pigments, dyes and reinforcing agents such as glass fibers and carbon fibers; as well as known flame-retarding agents such as TBBPA and a low molecular weight polycarbonate derived from TBBPA; and also synthetic resins such as polycarbonate derived from BPA, polyvinyl chloride and chlorinated polyethylene, insofar as these additives do not impair the properties of the resin composition.

The present invention will be further described by reference to the following illustrative Preparations and Examples. The ABS resins used in the examples are prepared as described in Preparations 1 and 2 by the mass-suspension polymerization process copolymer polycarbonate resins are prepared as described in Preparation 3. The invention is not limited to the subjects matter of these Preparations and Examples.

PREPARATION 1

Into a 120 liter reactor having a powerful stirring device (for example, a reactor as disclosed in the specification of Japanese Patent Publication No. 34150/1970), a rubber solution of the following recipe was charged (parts are given by weight; the same shall apply hereinafter);

| | |
|---|---|
| Styrene | 72 parts |
| Acrylonitrile | 28 parts |
| Tufden 2000A | 15 parts |
| (a butadiene-styrene copolymer rubber; a product of Asahi Kasei Co.) | |
| Dibenzoyl peroxide | 0.15 part |
| Dicumyl peroxide | 0.10 part |
| t-Dodecylmercaptan | 0.33 part |
| Butyl benzyl phthalate | 3 parts |
| Water | 20 parts |

After replacing the atmosphere in the apparatus with nitrogen, mass polymerization was effected while rotating the stirrer at 600 rpm., at a polymerization temperature of 73°C, for 3.5 hours. After the preliminary polymerization was thus completed, the reaction mixture was fed into a 250 liter pressure reactor containing a suspension of 4.5 parts of magnesium hydroxide in 80 parts of water. After nitrogen replacement in the reactor, suspension polymerization was performed at 120°C under stirring at 120 rpm. for 5 hours. After completion of the polymerization reaction, the reaction mixture was cooled and hydrochloric acid was added to dissolve and thereby to remove magnesium hydroxide. The resin product was washed thoroughly with water by using a 200 mesh filter cloth with a basket type centrifugal dryer. After filtration followed by drying, a beautiful pearly polymer was obtained. This product will be referred to as ABS-I hereinafter.

PREPARATION 2

A pearly polymer was obtained in the same manner as in Preparation 1 except that there was used a recipe consisting of

| | |
|---|---|
| Styrene | 30 parts |
| α-Methylstyrene | 30 parts |
| Acrylonitrile | 40 parts |
| Tufden 2000A | 12 parts |
| Dibenzoyl peroxide | 0.47 part |
| Dicumyl peroxide | 0.15 part |
| t-Dodecylmercaptan | 0.05 part |

A mass polymerization temperature of 75°C was employed instead of 73°C. All other steps of the process were the same as in Preparation 1. This product will be referred to as ABS-II hereinafter.

PREPARATION 3

In an aqueous solution obtained by dissolving 44 parts of sodium hydroxide in 585 parts of water, there were dissolved 30 parts of TBBPA, 79 parts of BPA, 0.2 part of hydrosulfite and 1.9 parts of p-tert.-butylphenol. 390 Parts of methylene chloride were added to the solution and then 46 parts of phosgene were blown into the mixture at a temperature of 20°C with stirring over a period of about 1 hour. After the introduction of phosgene, the reaction mixture was homogenized by vigorous stirring. Thereafter, 0.1 part of triethylamine was added thereto, and stirring was continued for about one hour to effect the polymerization. After completion of the reaction, the aqueous layer was separated out and the resin solution was purified and heated together with a blowing agent such as toluene and water. The solvent was removed and the resin was recovered as a granular product. The limiting viscosity of the resulting 112 parts of the thus obtained TBBPA-BPA copolycarbonate resin (in methylene chloride) was 0.467 at 25°C. The TBBPA content (this indicates the amount of the component derived from TBBPA monomer; the same shall apply hereinafter) of the resin, calculated from the Br content, was 27.0 weight percent. The copolymerized, halogenated aromatic polycarbonate thus obtained will be referred to as copolymer PC.

The mechanical and thermal properties and combustibility of the resins obtained in Preparations 1 to 3 are shown in Table 1.

The test methods and measurement conditions in the following examples and comparative examples are the same as shown in Table 1.

Table 1

| Physical Properties | Test Method (ASTM) | Unit | Physical properties of resins | | |
|---|---|---|---|---|---|
| | | | ABS-I | ABS-II | Copolymer PC |
| Tensile strength | D-638 | kg/cm² | 470 | 539 | 745 |
| Tensile breaking ductility | D-638 | % | 45 | 63 | 111 |
| Tensile yield ductility | D-638 | % | 8 | 10 | 2 |
| Bending yield strength | D-790 | kg/cm² | 670 | 710 | 1010 |
| Bending elasticity modulus | D-790 | kg/cm² | 22,300 | 24,400 | 24,300 |
| Izod impact strength (with notch, thickness 1/4") | D-256 | kg cm/cm | 15.3 | 11.2 | 7.1 |
| Deflection temperatures under heat 18.56 kg/cm², without annealing | D-648 | °C | 78.1 | 90.7 | 142 |
| Melt index (230°C, load 5 kg) | D-1238 | g/10 | 5.8 | 1.9 | *— |

Table 1-continued

| Physical Properties | Test Method (ASTM) | Unit | ABS-I | ABS-II | Copolymer PC |
|---|---|---|---|---|---|
| Combustibility | UL-94*** thickness 1/16" | min class | combustion | combustion | SE - O |
| Combustibility | ASTM D-635 thickness 1/8" | cm/min | 2.6 | 2.1 | **O |
| Remarks | | | | | Copolymerized, halogenated aromatic polycarbonate containing 27 wt. % of TBBPA |

*No flow was caused at 230°C under 5 kg load
**Contacted by flame for 30 seconds and then extinguished within 1-2 seconds and the flame did not reach the first indicator
***Underwriter's Laboratory UL-94

EXAMPLES 1 TO 4 AND COMPARATIVE EXAMPLE 1

Samples of 40 parts of copolymer PC (TBBPA content: 27 weight percent), obtained in Preparation 3, and 60 parts of ABS-II, obtained in Preparation 2, were blended with 1, 2 and 3 parts of antimony trioxide, respectively, in 10 liter V-type blenders for about 15 minutes to obtain homogeneous blends. The blends were then shaped into pellets with a general purpose single spindle extruder having a diameter of 40 mm, at a cylinder temperature of 240°C. The pellets were the shaped into predetermined test pieces with a 4 ounce screw-inline type molding machine. The results of measurements of the mechanical and thermal properties and combustibility of the test pieces are shown in Table 2.

In Comparative Example 1, the test pieces were prepared in the same manner from the same resin composition but they contain 6 parts of antimony trioxide. The results of measurements of mechanical and thermal properties and combustibility of the test pieces are also shown in Table 2.

The resin composition of Example 1, but not containing antimony trioxide, corresponds to condition SB of UL-94, and the combustion velocity thereof according to ASTM D-635 was 0.92 cm/min.

Table 2

| | Unit | Examples | | | | Comparative Example |
|---|---|---|---|---|---|---|
| | | 1 | 2 | 3 | 4 | 1 |
| Copolymer PC | parts by weight | 40 | 40 | 40 | 40 | 40 |
| ABS-II | " | 60 | 60 | 60 | 60 | 60 |
| Antimony trioxide | " | 1 | 2 | 3 | 5 | 6 |
| Tensile strength | kg/cm$^2$ | 615 | 611 | 623 | 620 | 617 |
| Tensile breaking ductility | % | 62 | 51 | 42 | 40 | 38 |
| Tensile yield ductility | % | 13 | 13 | 12 | 11 | 11 |
| Bending yield strength | kg/cm$^2$ | 890 | 910 | 890 | 870 | 820 |
| Bending elasticity modulus | kg/cm$^2$ | 23,100 | 22,600 | 22,400 | 21,100 | 21,200 |
| Izod impact strength (with notch, thickness ¼") | kg·cm/cm | 14.2 | 12.1 | 9.4 | 7.6 | 3.8 |
| Deflection temp. under heat 18.56 kg/cm$^2$, without annealing | °C | 98.1 | 99.4 | 100.1 | 99.5 | 99.0 |
| Melt index (230°C, load 5kg) | g/10 min. | 2.4 | 2.4 | 3.5 | 3.6 | 4.2 |
| Combustibility (UL-94) | Class | SE-O | SE-O | SE-O | SE-O | SE-O |
| Combustibility (ASTM-D 635) | cm/min | O* | O* | O* | O* | O* |

*Contacted with flame for 30 seconds and then extinguished within 0 to 1 second. The flame did not reach the first reactor indicator in each case.

EXAMPLE 5

60 Parts of copolymer PC containing 8.3 weight percent of TBBPA obtained in the same manner as Preparation 3 (having a limiting viscosity determined in methylene chloride at 25°C of 0.503) and 40 parts of ABS-I obtained in Preparation 1 were mixed with 2 parts of antimony trioxide, and the mixture was shaped into test pieces by injection molding in the same manner as in Example 1. The physical properties of the test pieces were measured. The test pieces had a tensile strength of 572 kg/cm$^2$ and an Izod impact strength of 16.1 kg.cm/cm. The combustion property of the test pieces according to UL-94 corresponded to SE-O. According to ASTM-D 635, the flame did not reach the first indicator and the test pieces were extinguished 2.8 seconds after the removal of the flame.

EXAMPLE 6

Forty parts of styrene-acrylonitrile copolymer (a product of Daicel Ltd.; having acrylonitrile content of 27.2 weight percent and an average molecular weight of 86,000) were mixed with 60 parts of ABS-I obtained in Preparation 1. 40 parts of the above mixture, 60 parts of copolymer PC obtained in Preparation 3, and 2 parts of antimony trioxide was shaped into pellets in the same manner as in Example 1. Appropriate test pieces were obtained from the pellets, and the physical properties of the test pieces were determined. The test pieces had a tensile strength of 602 kg/cm² and an Izod impact strength of 10.1 kg.cm/cm. The combustion property of the test pieces according to UL-94 corresponded to SE-O. According to ASTM-D 635, the flame did not reach the first indicator and the test pieces were extinguished 1.2 seconds after the removal of the flame.

EXAMPLE 7

A mixture of 40 parts of copolymer PC (having a limiting viscosity measured in methylene chloride at 25°C of 0.485) containing 21.0 weight percent of TBBPA obtained in the same manner as in Preparation 3, 20 parts of homopolycarbonate obtained from BPA (a product of Mitsubishi Gas Chemical Co., Ltd., having an average molecular weight of 23,000), 40 parts of ABS-II and 1 part of antimony trioxide was shaped into pellets, from which test pieces were prepared in the same manner as in Example 1. The mechanical properties of the test pieces were determined. The test pieces had a tensile strength of 589 kg/cm² and an Izod impact strength of 18.5 kg.cm/cm. The combustion property of the pieces according to UL-94 corresponded to SE-O. According to ASTM-D 635, the flame did not reach the first indicator and the test pieces were extinguished 2.0 seconds after the removal of the flame.

Examples 8 to 10 and Comparative Examples 2 and 3

ABS-II obtained in Preparation 2 and copolymer PC obtained in Preparation 3 were mixed together in the proportions shown in Table 3, and 0.5 part of antimony trioxide was added thereto. The thus obtained composition was shaped into pellets, from which test pieces were prepared in the same manner as in Example 1.

The physical properties of the test pieces were shown in Table 3.

Table 3

|  | Unit | Example 8 | Example 9 | Example 10 | Comp. Example 2 | Comp. Example 3 |
|---|---|---|---|---|---|---|
| Copolymer PC | part | 25 | 50 | 75 | 10 | 90 |
| ABS - II | part | 75 | 50 | 25 | 90 | 10 |
| Antimony trioxide | part | 0.5 | 0.5 | 0.5 | 0.5 | 0.5 |
| Tensile strength | kg/cm² | 586 | 639 | 650 | 531 | 692 |
| Tensile breaking ductility | % | 57 | 81 | 86 | 48 | 95 |
| Tensile yield ductility | % | 11 | 13 | 14 | 10 | 14 |
| Bending yield strength | kg/cm² | 850 | 930 | 950 | 750 | 980 |
| Bending elasticity modulus | kg/cm² | 24,200 | 24,500 | 24,000 | 24,100 | 24,300 |
| Izod impact strength (with notch thickness, 1/4") | kg·cm/cm | 9.8 | 18.4 | 11.5 | 7.1 | 5.3 |
| Deflection temp. under heat (18.56 kg/cm², without annealing) | °C | 95.0 | 103.2 | 116.0 | 92.5 | 134.1 |
| Melt index (23°C, load 5kg) | g/10 min. | 1.7 | 1.3 | 1.0 | 1.8 | —* |
| Combustibility (UL-94) (thickness 1/16") | Class | S-B | SE-O | SE-O | Combustion | SE-O |
| Combustibility (ASTM-D 635, thickness 1/8") | cm/min | 0.45** | 0*** | 0*** | 1.8 | 0*** |

*Determination was impossible at 230°C under 5 kg load.
**After flaming for 30 seconds, the test pieces were extinguished at a position 5 to 8 mm distant from the first indicator.
***After flaming for 30 seconds, the test pieces were extinguished within 1 to 5 seconds and did not reach the first indicator.

EXAMPLE 11

Forty parts of a mixture comprising 85 weight percent of copolymer PC used in Example 4 and 15 weight percent of homopolymerized low molecular weight PC from TBBPA as a flame-retarding agent having a limiting viscosity in methylene chloride at 25°C of 0.042, 60 parts of ABS-I and 3 parts of antimony trioxide were mixed together. The mixture was then shaped into pellets, from which test pieces were prepared in the same manner as in Example 1. The mechanical properties of the test pieces were measured to give a tensile strength of 609 kg/cm² and an Izod impact strength of 16.9 kg.cm/cm. The combustion property according to UL-94 correspond to SE-O. According to ASTM-D 675, the flame did not reach the first indicator and the test pieces were extinguished one second after the removal of the flame.

The embodiments of the invention in which an exclusive property or privilege is claimed are defined as follows:

1. An impact-resistant, flame retardant, blended resin composition in which the resin components of said composition consist essentially of a mixture of
   A. from 15 to 85 weight percent of ABS resin,
   B. from 15 to 85 percent by weight of a high molecular weight aromatic polycarbonate copolymer prepared from a mixture of bisphenols consisting essentially of from 5 to 50 weight percent of nuclear-halogen-substituted bisphenol and the balance is an unsubstituted bisphenol,
and an inorganic or organic antimony flame-retardant compound in an amount of from 0.3 to 5 parts by weight per 100 parts by weight of the resin mixture.

2. A resin composition according to claim 1 in which the copolymer (B) has a limiting viscosity of from about 0.25 to about 0.75 in methylene chloride at 25°C.

3. A resin composition according to claim 1 in which the antimony compound is antimony trioxide.

4. A resin composition according to claim 1 in which the copolymer B is a copolymer of tetrabromobisphenol A and bisphenol A.

5. A resin composition according to claim 1, in which the resin mixture consists essentially of from 35 to 70 weight percent of (A) and the balance is (B), and the amount of antimony compound is from about 0.5 to 3 parts by weight, per 100 parts by weight of the resin mixture.

6. A resin composition according to claim 1, wherein (B) contains from 5 to 30 weight percent of nuclear-halogen-substituted-bisphenol and the balance is unsubstituted phenol.

7. A resin composition according to claim 1, in which said ABS resin contains from 5 to 50 parts by weight of polybutadiene or butadiene copolymer per 100 parts by weight of the sum of a vinyl cyano compound and vinyl aromatic compound, and wherein the sum of said vinyl cyano compound plus vinyl aromatic compound comprises from 10–50 weight percent of vinyl cyano compound and the balance is said vinyl aromatic compound.

8. A resin composition according to claim 7, wherein the ABS resin contains from 10 to 35 parts by weight of polybutadiene or butadiene copolymer per 100 parts by weight of the sum of said vinyl cyano compound and said vinyl aromatic compound and wherein the sum of said vinyl cyano compound plus said vinyl aromatic compound comprises 20 to 40 weight percent of said vinyl cyano and the balance is said vinyl aromatic compound.

* * * * *

UNITED STATES PATENT OFFICE
CERTIFICATE OF CORRECTION

Patent No. 3,981,843               Dated September 21, 1976

Inventor(s) Hiroyuki Yoshizaki et al

It is certified that error appears in the above-identified patent and that said Letters Patent are hereby corrected as shown below:

On the title page at [75] change "Yuzo Sonoyama" to

---Yuzo Toga---.

Column 10, line 63; after "blended" insert a comma ---,---.

Signed and Sealed this

Twenty-second Day of February 1977

[SEAL]

Attest:

RUTH C. MASON
*Attesting Officer*

C. MARSHALL DANN
*Commissioner of Patents and Trademarks*